United States Patent
Peterson

(10) Patent No.: US 6,247,488 B1
(45) Date of Patent: Jun. 19, 2001

(54) NON RETURN VALVE SYSTEM AND METHOD FOR FORMING SAID NON RETURN VALVE SYSTEM

(76) Inventor: Bengt Peterson, Stutaliden 33, S-434 94 Vallda (SE)

( * ) Notice: Subject to any disclaimer, the term of this patent is extended or adjusted under 35 U.S.C. 154(b) by 0 days.

(21) Appl. No.: 09/214,019
(22) PCT Filed: Jul. 4, 1997
(86) PCT No.: PCT/SE97/01212
§ 371 Date: Dec. 22, 1998
§ 102(e) Date: Dec. 22, 1998
(87) PCT Pub. No.: WO98/01691
PCT Pub. Date: Jan. 15, 1998

(30) Foreign Application Priority Data

Jul. 9, 1996 (SE) .................................................. 9602708

(51) Int. Cl.$^7$ .................................................. F16K 15/14
(52) U.S. Cl. ........................ 137/223; 137/846; 446/224
(58) Field of Search ..................................... 137/223, 848, 137/846; 446/224

(56) References Cited

U.S. PATENT DOCUMENTS

| | | | |
|---|---|---|---|
| 4,674,532 | * | 6/1987 | Koyanagi ........................ 446/224 X |
| 4,842,007 | * | 6/1989 | Kurtz .................................... 137/223 |
| 4,917,646 | * | 4/1990 | Kieves ................................. 446/224 |
| 4,983,138 | * | 1/1991 | McGrath .............................. 446/224 |
| 5,209,264 | * | 5/1993 | Koyanagi ........................ 137/846 X |
| 5,248,275 | * | 9/1993 | McGrath et al. .................... 446/224 |
| 5,564,143 | * | 10/1996 | Pekar et al. ...................... 137/846 X |
| 5,830,780 | * | 11/1998 | Dennison et al. ............... 446/224 X |
| 5,860,441 | * | 1/1999 | Garcia ............................. 137/846 X |
| 5,878,768 | * | 3/1999 | Carrasco .......................... 137/223 X |
| 5,934,310 | * | 8/1999 | Littlehorn .............................. 137/223 |

* cited by examiner

*Primary Examiner*—John Rivell
*Assistant Examiner*—Meredith H Schoenfeld
(74) *Attorney, Agent, or Firm*—Orum & Roth

(57) ABSTRACT

The present invention relates to a non return valve which is provided by welding two lines in two flat upon each other lying film surfaces, which are then folded towards each other and after that they are joined together around the outer edges except the opening channel so that over pressure is formed when the container is filled completely or partly and then the non return valve starts to operate with safe sealing. The opening channel is formed between two against each other lying sections of film material, which sections extend from the outside of the container into it and are joined together right up to the opening channel.

2 Claims, 3 Drawing Sheets

NON RETURN VALVE SYSTEM AND METHOD FOR FORMING SAID NON RETURN VALVE SYSTEM

The present invention relates to a non return valve system for air or liquid filled containers designed from flexible plastic or rubber film material and which executes its non return valve function when the container, which for example may be a mattress, a pillow or a package, has been filled with air or liquid, and which valve system comprises an opening channel.

STATE OF THE ART AND PROBLEM

There are many kinds of non return valves on the market. All of them are more or less complicated. In all cases, there are separate units that should be mounted on the containers manually or by means of automatic systems and or requires extra sealing means like plugs, clamps or welding.

The above pointed out quality problems and irrational production methods makes the products considerably more expensive.

SOLUTION AND ADVANTAGES

A first object of the present invention is to provide industrial engineering advantages with lower and more competitive prices and increasing quality for the containers by means of the more simple and more safe non return valve system which is provided.

Said object is achieved according to the present invention, the characteristics of which appears from the accompanying claim 1, namely that the opening channel is formed between two sections of the film material superimposed one on another, which sections extend from the outside of the container into the same and are joined together right up to the opening channel.

The invention also relates to a method for forming a non return valve system with an opening channel for filling and draining, for an air or liquid filled container such as for example a mattress, a pillow or a package of flexible plastic or rubber film material and which executes its non return valve function when the container has been filled with air/liquid, according to the system.

Said method is substantially characterized in that two sections of the film material are joined together at each side of the opening channel, that the joined together sections of the film material are folded so that they end up inside the container, and that the outer edges of the container then are joined together except where the opening channel has been provided.

Figure 1:
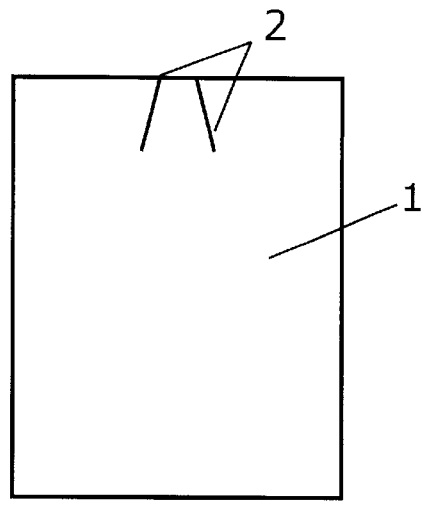
Figure 2:
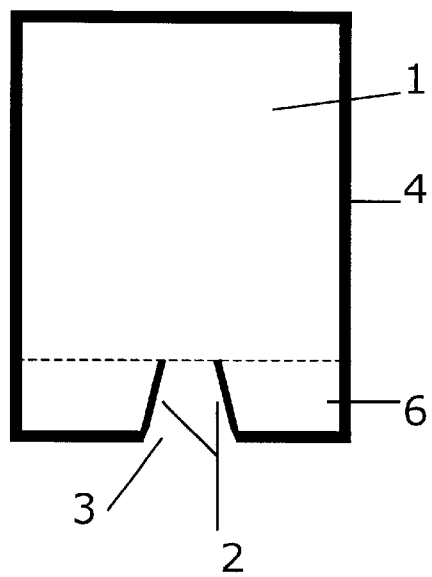
Figure 3:
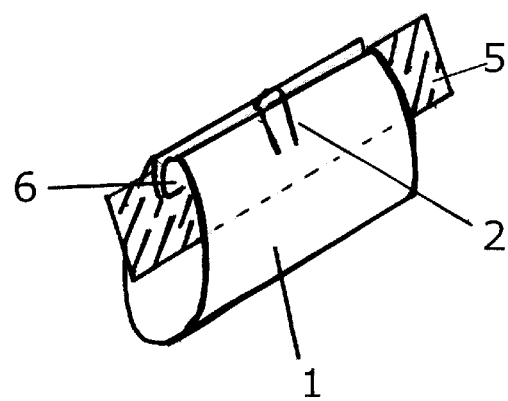
Figure 4:
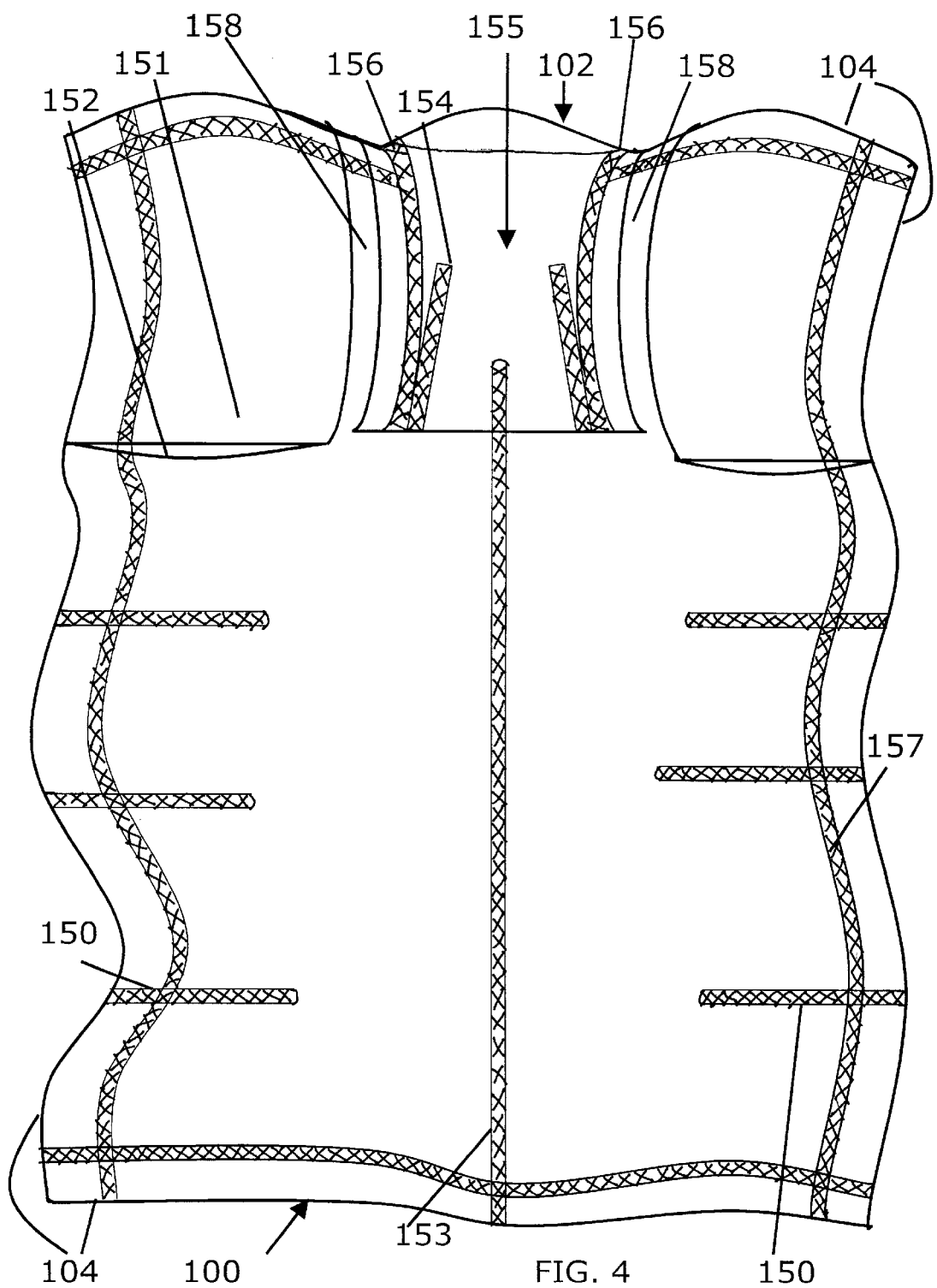
Figure 5:
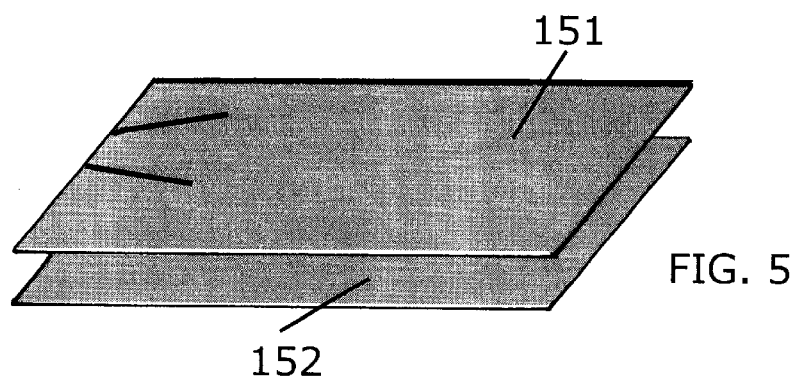
Figure 6:
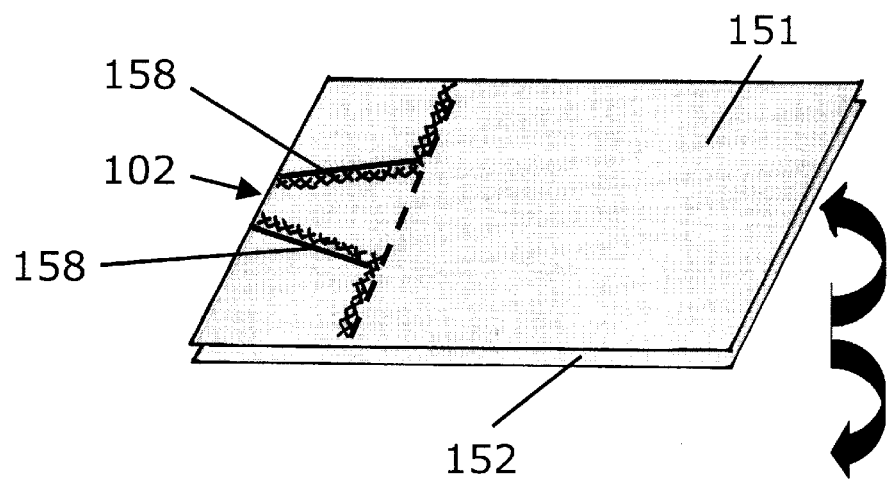
Figure 7:
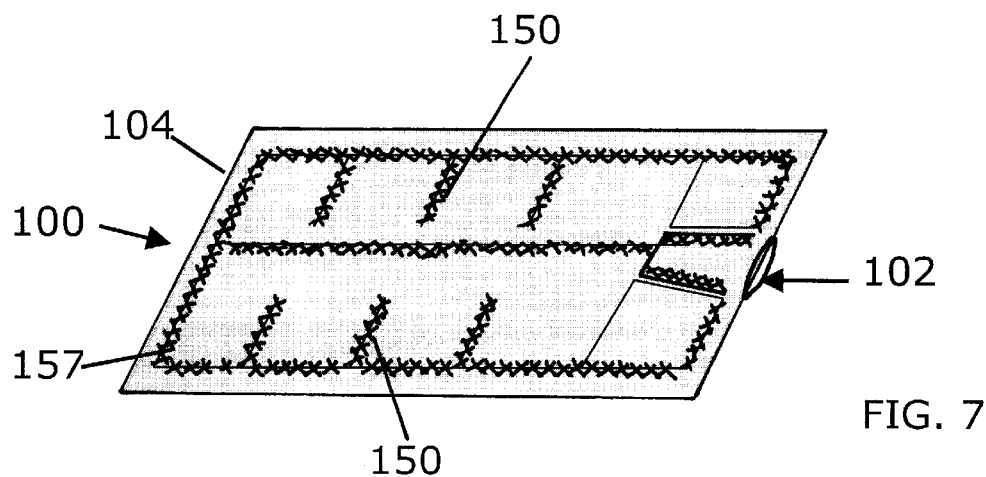

The invention will now be described in greater detail in the following with reference to embodiments which are shown in the accompanying drawings in which FIG. 1 shows a non return valve in accordance with the invention seen in flat condition made at a container for air or liquids, FIG. 2 shows the non return valve at a made container seen from one of its flat sides, FIG. 3 shows an embodiment with an interlining included in the non return valve, FIG. 4 shows the application of the invention for an ice freeze bag, and FIGS. 5–7 shows different phases in the manufacturing of such a bag.

Thus, the invention relates to an arrangement during production of for example mattresses, pillows, air or liquid filled packages, which will be rational and without separately mounted non return valve and or closing apparatus which provides a safe sealing function.

The non return valve system is formed by joining and folding the same film material in one unit.

Thus, FIG. 1, 2 shows the non return valve element 2, which by means of its design 2, seals and provides the non return valve function at over pressure in the air or liquid filled container.

The non return valve 2 is designed with welded lines 2 which are folded in 6, and afterwards joining 4 takes place, of the double folded film 6, in the outer edge around except for the opening channel 3, and thereby forming an air liquid receiving container with non return valve function and sealing 2, 3.

When it is necessary to empty the container, a tube is inserted through the opening channel 3 so that the film which forms the non return valve 2, is separated and draining takes place.

FIG. 3 shows the interlayer 5, when the non return valve is to be attached against one of the inner walls.

The non return valve element 2 is formed by folding the film and by turning against each other and joining so that an opening channel 3 is provided enabling filling and draining. After that, the insides of the film 1, are turned against each other and joined at 4, around the outer edges except where the opening channel 3, is located. When air or liquid is filled into the formed container, through the opening channel 3, is a safe sealing of the over pressure provided. The container is emptied by entering for example a tube which is inserted into the opening channel 3.

An additional interlayer 5, for example of Teflon film, may be used during joining together, so that the non return valve 2, is attached against an inside of the container.

A method for making a non return valve system with an opening channel 3 for filling and draining, for an air or liquid filled container like for example a mattress, a pillow or a package of flexible plastic or rubber film material and which executes its non return valve function when the container has been filled with air/liquid, according to the invention takes place in the following way that two sections of the film material 1 are joined together at each side of the opening channel 3, that the joined together sections of the film material are folded so that they end up inside the container, and that the outer edges of the container then are joined together 4 except where the opening channel 3 has been provided. In doing so, an interlayer 5 of for example Teflon film may be placed between the two sections of the film material before joining together, wherein the non return valve 2 is fastened to one inside of the container. The non return valve 2 is designed with welded lines which are folded in, wherein joining together 4 of the double folded film 6 take place around the outer edge, except the opening channel 3, and thereby forming an air and liquid receptacle container with non return valve function and sealing 2, 3.

In FIG. 4 is shown a package 100 which exhibits a non return valve 102 according to the invention and which intended to be applied when freezing ice cubes. For this object, a number of welds 150 which join together the two material sections 151, 152 extend across the package 100. A centre weld 153 which holds the material sections 151, 152 together along their centre, also reaches up to the non return valve 102 and holds it in place, side welds 154 in the non return valve 102 makes the inlet opening 155 more narrow inside side welds 156 for the valve 102. A weld 157 which extends around the package 100 and their outer edges 104 except in front of the non return valve 102, join together the material sections 151, 152 for forming a bag 100.

In order to get efficient valve function with safe closing of the non return valve 102 it is advantageous to have the material sections 151, 152 slit 158 up at each side of the non return valve 102. It is also convenient to use such a sticky material as possible for the material sections 151, 152 at least in the area where they form said non return valve 102. E.g. plastic may contain a lot of oil which makes the material sticky, as for example polythene or other suitable material. Only one layer side may be provided with sticky surface and which may also be arranged by means of external application of a sticky medium onto the layer or that it is treated in a suitable way in order to render the material in itself a sticky function.

The invention is not limited to the above described and in the drawings shown embodiments but may be varied within the scope of the accompanying claims without departing from the inventive concept.

What is claimed is:

1. A non return valve system for air or liquid filled containers designed from flexible plastic or rubber film material and which executes its non return valve function when the container, which may be a mattress, a pillow or a package, has been filled with air or liquid, and which valve system comprises an opening channel, wherein the opening channel is formed between two superimposed one on another sections of the film material, which sections extend from the outside of the container into the same and are joined together right up to the opening channel;

the film material forming the opening channel is continuous with film material forming the container.

2. A container with integral non return valve comprising:

two film surfaces, each of said film surfaces having an opening channel section continuous with a container body section having a perimeter;

said open channel section film surfaces superimposed one on another having two weld lines welding said opening channel sections together, defining an opening channel there between;

said container body sections arranged and configured with said opening channel between them and welded around said perimeter except for an exit of said opening channel.

* * * * *